United States Patent
Li et al.

(10) Patent No.: US 7,428,783 B2
(45) Date of Patent: Sep. 30, 2008

(54) TESTING SYSTEM FOR FLATNESS AND PARALLELISM

(75) Inventors: Lei Li, Shenzhen (CN); Zhi Cheng, Shenzhen (CN); Ping Chen, Shenzhen (CN); Ai-Ge Sun, Shenzhen (CN); Xue-Liang Zhai, Shenzhen (CN); Chang-Fa Sun, Shenzhen (CN)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/615,896

(22) Filed: Dec. 22, 2006

(65) Prior Publication Data

US 2007/0240322 A1 Oct. 18, 2007

(30) Foreign Application Priority Data

Apr. 14, 2006 (CN) .................. 2006 1 0060314

(51) Int. Cl.
*G01B 5/20* (2006.01)
*G01B 7/28* (2006.01)

(52) U.S. Cl. ....................................... 33/533
(58) Field of Classification Search ............. 33/533, 33/549, 551, 552, 555, 514.2, 515, 561.1, 33/561.3
See application file for complete search history.

(56) References Cited

U.S. PATENT DOCUMENTS

| | | | | |
|---|---|---|---|---|
| 2,010,407 A | * | 8/1935 | Matthias ............... | 33/514.2 |
| 4,693,012 A | * | 9/1987 | Cesna .................. | 33/533 |
| 4,916,824 A | * | 4/1990 | Shimazutsu et al. ..... | 33/551 |
| 4,936,560 A | * | 6/1990 | Barozzi ................ | 269/266 |
| 5,012,588 A | * | 5/1991 | Face, III .............. | 33/533 |
| 5,205,046 A | * | 4/1993 | Barnett et al. ......... | 33/533 |
| 5,317,811 A | * | 6/1994 | Berwick ............... | 33/507 |
| 6,907,672 B2 | * | 6/2005 | Said .................... | 33/552 |
| 7,131,209 B2 | * | 11/2006 | Kim ..................... | 33/533 |

FOREIGN PATENT DOCUMENTS

JP 06058703 A * 3/1994

* cited by examiner

*Primary Examiner*—Christopher W Fulton
(74) *Attorney, Agent, or Firm*—Andrew C. Cheng

(57) ABSTRACT

A testing system for testing flatness of a surface of a workpiece includes a testing apparatus (10) and a processor (20). The testing apparatus includes a testing box (12) and a measuring apparatus (14). The testing box includes a plurality of holders (122); the holders define a datum plane. The measuring apparatus comprises a plurality of movable testing poles (142) extending out of the testing box and a plurality of gauges (141) configured for measuring distance of the testing poles retracting into the testing box. Ends (1421) of the testing poles away from the testing box are located at the datum plane and configured for supporting the surface of the workpiece thereon to allow the gauges measuring retracting distance of the testing poles under the pressure of the workpiece. The retracting distance of the testing poles is equal to distances between testing points on the surface of the workpieces and the datum plane. The processor is connected to the testing apparatus for receiving and processing testing data that are converted from the retracting distance of the testing poles measured by the gauges.

13 Claims, 4 Drawing Sheets

TESTING SYSTEM FOR FLATNESS AND PARALLELISM

BACKGROUND OF THE INVENTION

1. Field of the Invention

The present invention relates generally to a testing system for testing flatness and parallelism of workpieces, and, more particularly, to a testing system that can simplify procedures for testing flatness and parallelism of workpieces.

2. Description of Related Art

Flatness and parallelism of many workpieces require testing. At present, flatness and parallelism of workpieces are mainly tested using a three-dimensional testing method. In this method, a plurality of testing points of each workpiece are tested in order by a three-dimensional testing apparatus. The three-dimensional testing apparatus receives relational data, and a processor processes the data and displays test results.

However, it is complicated to test a plurality of testing points. Receiving and processing data take much time. Therefore, the three-dimensional testing method has a low testing speed. Additionally, typical three-dimensional testing apparatuses are usually too big and difficult to move. Thus the typical apparatuses are only capable of testing a few workpieces in laboratories and are unfit for large-scale use.

Therefore, a new testing system for testing flatness and parallelism of workpieces is desired in order to overcome the above-described shortcomings.

SUMMARY OF THE INVENTION

In one aspect, a testing system for testing flatness of a surface of a workpiece includes a testing apparatus and a processor. The testing apparatus includes a testing box and a measuring apparatus. The testing box includes a plurality of holders; the holders define a datum plane. The measuring apparatus comprises a plurality of movable testing poles extending out of the testing box and a plurality of gauges configured for measuring distance of the testing poles retracting into the testing box. Ends of the testing poles away from the testing box are located at the datum plane and configured for supporting the surface of the workpiece thereon to allow the gauges measuring retracting distance of the testing poles under the pressure of the workpiece. The retracting distance of the testing poles is equal to distances between testing points on the surface of the workpieces and the datum plane. The processor is connected to the testing apparatus for receiving and processing testing data that are converted from the retracting distance of the testing poles measured by the gauges.

In another aspect, a testing method for testing flatness of surfaces of workpieces, comprising steps of: providing a testing system, the testing system including a testing apparatus and a processor; the testing apparatus including a testing box and a measuring apparatus, the testing box including a plurality of holders, the holders defining a datum plane, the measuring apparatus configured for measuring distance between testing points on the surfaces of the workpieces and the datum plane; the processor being connected to the testing apparatus; setting testing parameters; measuring distances between a plurality of testing points on the workpiece and the datum plane and recording the distances as testing data; inputting the testing data to the processor; and the processor processing the testing data and generating test results via comparing the testing data with the testing parameters.

Other advantages and novel features will become more apparent from the following detailed description when taken in conjunction with the accompanying drawings.

BRIEF DESCRIPTION OF THE DRAWINGS

Many aspects of the testing system can be better understood with reference to the following drawings. The components in various of the drawings are not necessarily drawn to scale, the emphasis instead being placed upon clearly illustrating the principles of the testing system and the testing method. Moreover, in the drawings, like reference numerals designate corresponding parts throughout several of the views.

DETAILED DESCRIPTION OF THE INVENTION

Figure 1:
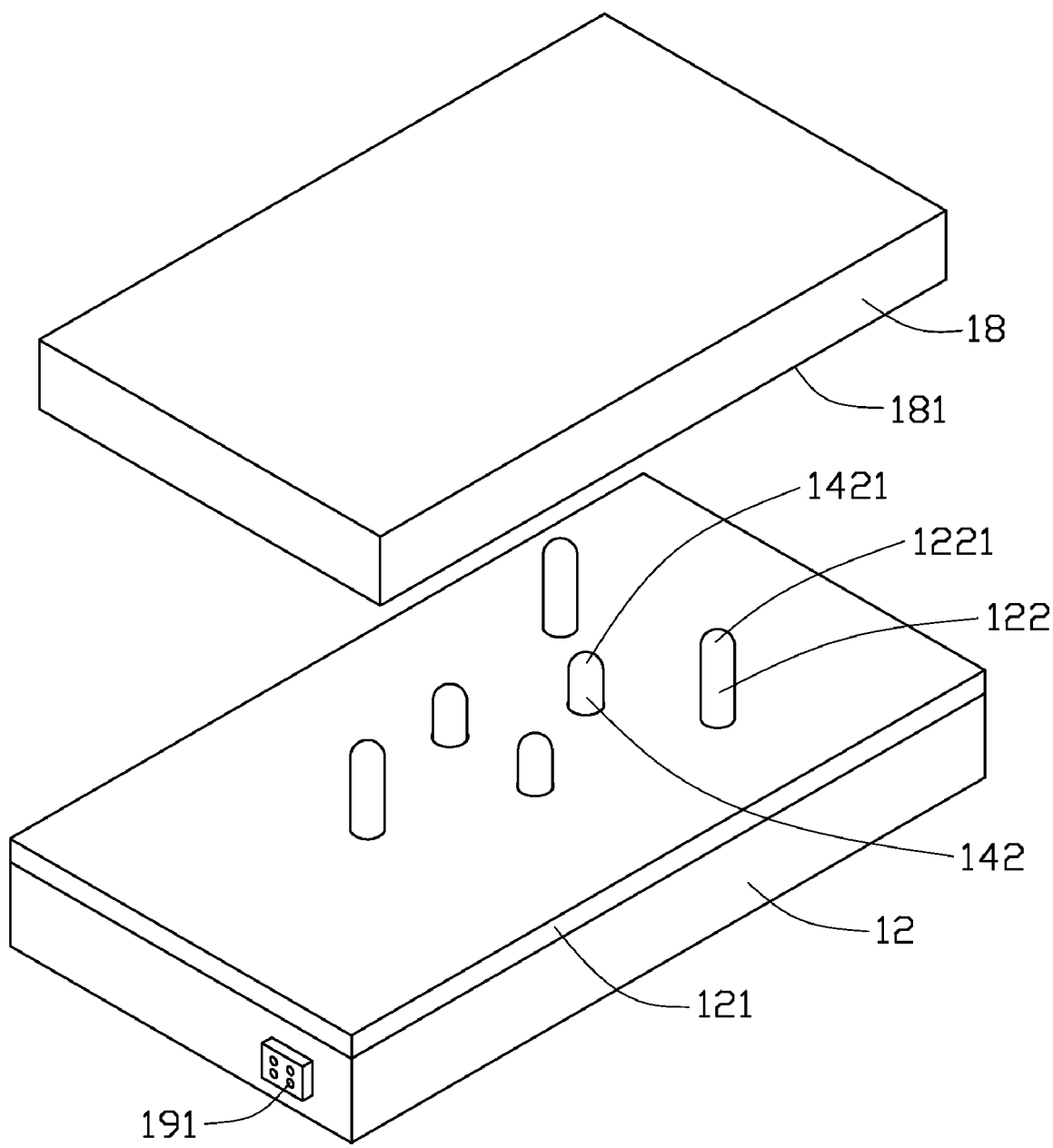
FIG. 1 is a schematic view of an testing apparatus of a testing system in accordance with a preferred embodiment of the present invention.
Figure 2:
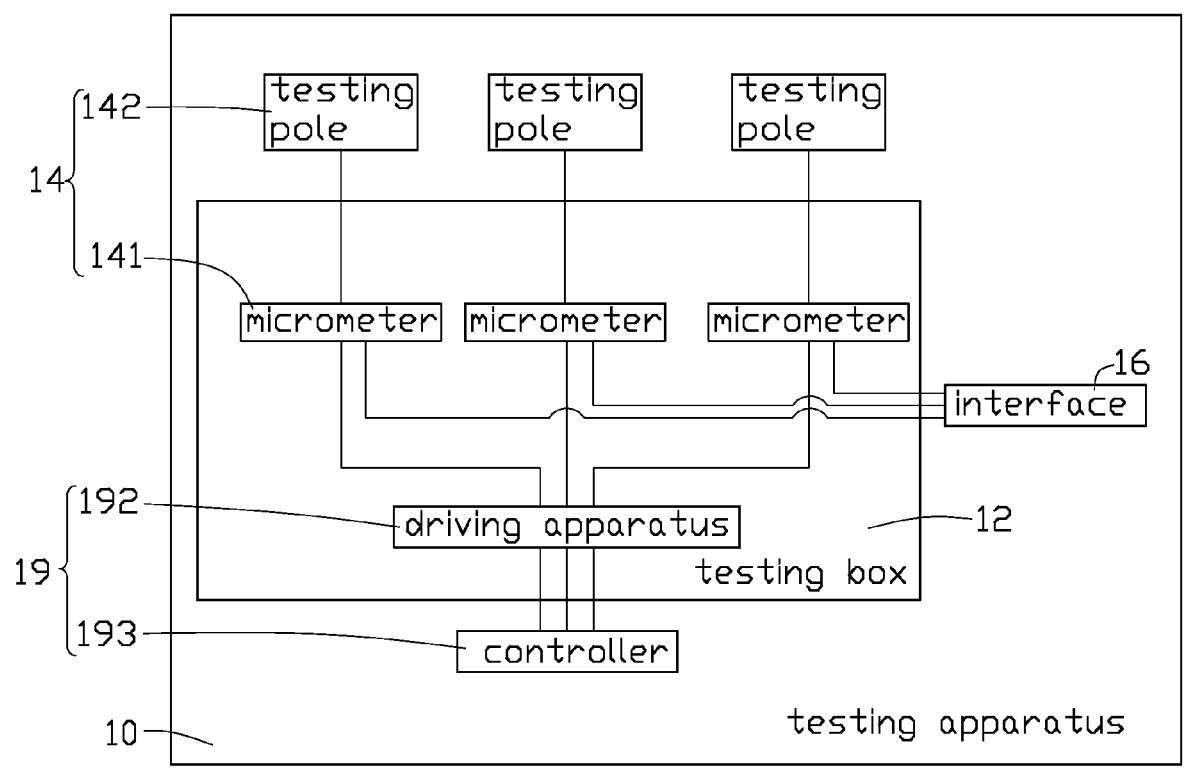
FIG. 2 is a block diagram of a testing box of the testing system in accordance with the preferred embodiment of the present invention.
Figure 3:
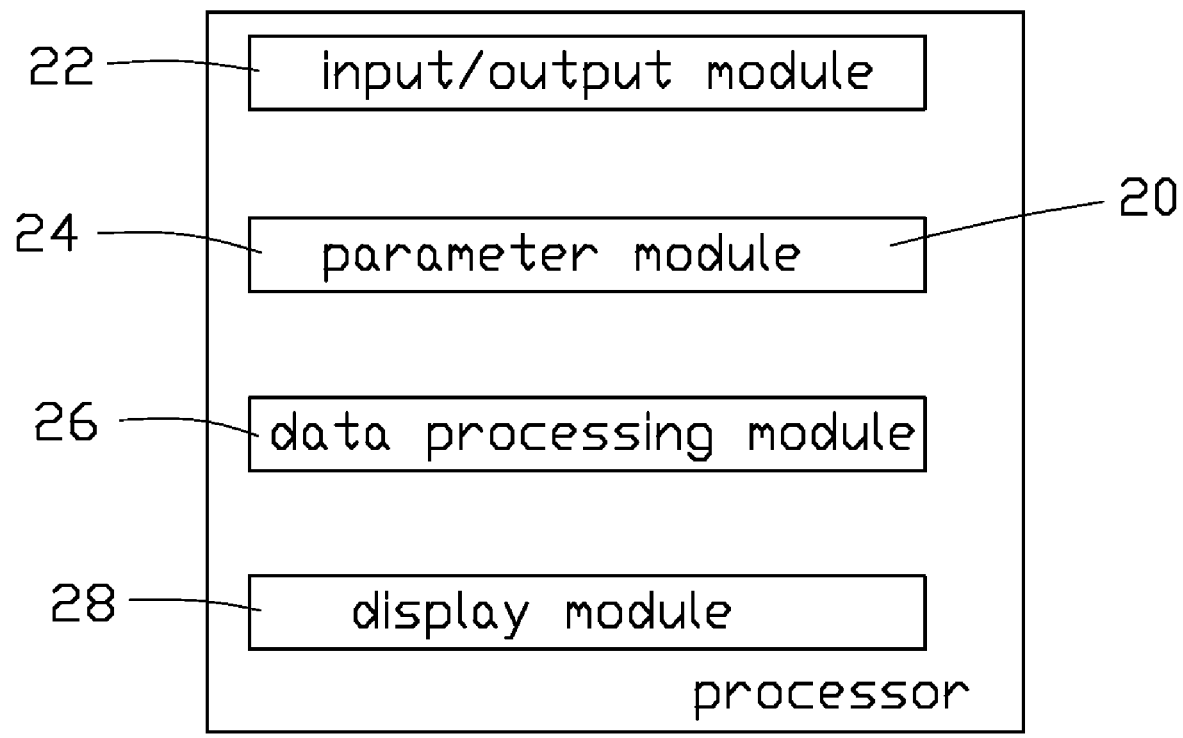
FIG. 3 is a block diagram of a processor of the testing system in accordance with the preferred embodiment of the present invention.

Referring now to the drawings in detail, FIGS. 1-3 show a testing system in accordance with a preferred embodiment of the present invention. The testing system includes a testing apparatus 10 and a processor 20. The testing apparatus 10 is connected to the processor 20. The testing system is used to test flatness of workpieces (not shown) and parallelism between workpieces and a datum plane.

The testing apparatus 10 is used to receive relational data. The testing apparatus 10 includes a testing box 12, a measuring apparatus 14, an interface 16, a checking block 18, and a controlling apparatus 19.

The testing box 12 includes a flat top board 121 and a plurality of holders 122. The number of the holders 122 can be three or more than three. The holders 122 are all mounted on the top board 121, and top ends 1221 of all holders 122 define a perfect datum plane (not shown).

The measuring apparatus 14 includes a plurality of micrometers 141, the micrometers 141 are all mounted in the testing box 12 and electrically connected to the interface 16. Each micrometer 141 includes a testing pole 142. Each testing pole 142 runs through the top board 121 and can move along its axis. Top ends 1421 of all testing poles 142 are exposed through the top board 121, and the top ends 1421 of the testing poles 142 correspond to a plurality of testing points (not shown) of each workpiece.

The checking block 18 includes a precise checking plane 181 for checking the testing system before testing the workpieces. The controlling apparatus 19 includes a plurality of buttons 191, a driving apparatus 192, and a controller 193. The buttons 191 are mounted on an outside of the testing box 12 and electrically connected to the controller 193. The driving apparatus 192 and the controller 193 are mounted in the testing box 12. The controller 193 can control the driving apparatus 192. The driving apparatus 192 is a typical driving apparatus, such as a pneumatic driving apparatus, an electric driving apparatus, etc. The driving apparatus 192 is connected to the micrometers 141 and holds the testing poles 142. When the driving apparatus 192 moves, the testing poles 142 are also driven to move by the driving apparatus 192. Therefore the controlling apparatus 19 can change positions of the testing poles 142.

The processor 20 is used to process relational data and display test results. The processor 20 can be a computer or a memory chip, etc. The processor 20 includes an input/output module 22, a parameter module 24, a data processing module 26, and a display module 28. The input/output module 22 is electrically connected to the interface 16 and used to transfer data between the testing apparatus 10 and the processor 20. The parameter module 24 is used to set and save testing parameters. The data processor module 26 is used to process relational data. The display module 28 is used to display relational data and test results.

Figure 4:
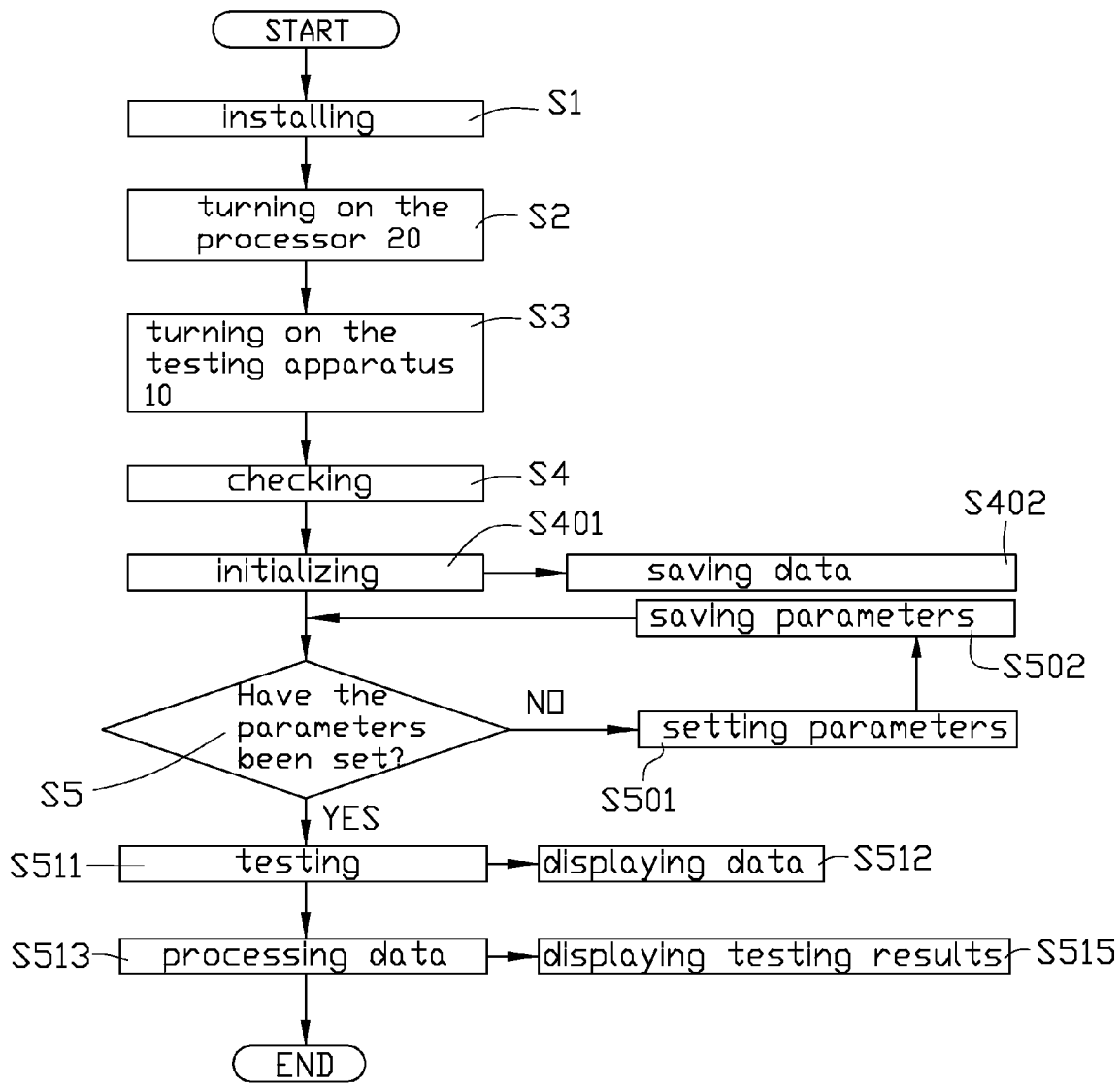
FIG. 4 is a flow chart of a testing method in accordance with a preferred embodiment of the present invention.

Referring to FIG. 4, a testing method in accordance with a preferred embodiment of the present invention is used to test workpieces. The testing method includes the following steps:

Installing the testing system, connecting the testing apparatus 10 to the processor 20 via the interface 16 (Step S1).

Turning on the testing apparatus 10 and the processor 20 (Step S2 and Step S3).

Checking the testing system (Step S4). The top ends 1421 of the testing poles 142 require to be adjusted to locate at the datum plane formed by the top ends 1221 of the holders 122. The checking block 18 is placed on the top board 121 and held by the holders 122. The checking plane 181 of the checking block 18 coincides with the datum plane. The controlling apparatus 19 can be used to change positions of the testing poles 142 to cause the top end 1421 of each testing pole 142 being as close to the checking plane 18 as possible. The buttons 191 are used to manipulate the controller 193, and the controller 193 controls the driving apparatus 192. The driving apparatus 192 drives the testing poles 142 to move. The top end 1421 of each testing pole 142 is adjusted to be as close to the checking plane 18 as possible. When the top end 1421 of each testing pole 142 is in contact with the checking plane 181, the testing system is checked. The testing system is then initialized (Step S401). The position of each testing pole at that moment is set as an initial position. Each micrometer 141 measures the initial position of its respective testing pole 142, and data of each initial position is transferred to the processor 20 via the interface 16 and saved (Step S402).

In another process of checking and initializing the testing system, the testing poles 142 are moved upwardly by the controlling apparatus 19, and the top end 1421 of each testing pole 142 rises to be higher than the top ends of the holders 122. The checking block 18 is then placed on the top board 121, and the checking plane 181 is placed in contact with the top ends 1421 of the testing poles 142. The checking block 18 is then pressed to the top board 121, and the top ends of the testing poles 142 are pressed downward. When the holders 122 hold the checking block 18, the checking plane 181 coincides with the datum plane, and the top end of each tasting pole 142 is pressed into the datum plane. In this way, the testing system can be initialized, and relational data is transferred to the processor 20 and saved.

After checking the testing system, the checking block 18 is taken away. Before testing the workpieces, it is necessary to test whether testing parameters have been set in the testing system (Step S5). If the testing parameters have not been set into the testing system, the parameter module 24 is used to set testing parameters (Step S501) and save the testing parameters (Step S502). In this method, a distance between each testing point on the workpiece and the datum plane is recorded as testing data of the testing point. The testing parameters represent fluctuation of the testing data of all testing points. For example, the testing parameters can be a permissible range of a difference between testing data of any two testing points, or a permissible range of a standard deviation of all testing data.

After setting testing parameters, the workpiece is tested (Step S511). A workpiece is placed on the top board 121 and the holders 122 hold a testing plane of the workpiece that needs to be tested. A top end of each testing pole 142 is in contact with a testing point on the testing plane. An additional force can be exerted on the workpiece to press the testing plane in tight contact with the testing poles 142. After the workpiece is stably placed, displacement of a top end 1421 of each testing pole 142 is measured as testing data of a testing point corresponding to the testing pole 142. The testing data of each testing point is measured by a respective micrometer 141 and is input into the input/output module 22 via the interface 16. The processor 20 saves the testing data and the display module 28 displays the testing data (Step S512).

The data processing module 26 processes the testing data and finds test results(Step S513), and the display module 28 displays test results (Step S514). The testing data is compared with the testing parameters. If the testing data of all testing points fluctuates in a range that is less than the testing parameter, for example, a difference between testing data of any two testing points or a standard deviation of all testing data is less than the testing parameter, a distance between a testing point on the testing plane and the datum plane is approximate with another distance between any other testing point and the datum plane. Thus the testing plane has an allowable flatness, and the testing plane has an allowable parallelism to the datum plane. The display module 28 displays that this workpiece can pass the testing system to an operator.

On the other hand, if the testing data of all testing points fluctuates in a range that is larger than the testing parameter, for example, a difference between testing data of any two testing points or a standard deviation of all testing data is larger than the testing parameter, a distance each between a testing point on the testing plane and the datum plane is distinctly different from another distance between any other testing point and the datum plane. Thus the testing plane has an unacceptable flatness, and the testing plane has an unacceptable parallelism to the datum plane. The display module 28 displays that this workpiece cannot pass the testing system.

Understandably, the controlling apparatus 19 can also be connected to the processor 20 and can drive the testing poles 142 to move via the processor 20. To save testing time, the testing parameters can be set (Step S501) and saved (Step S502) before checking the testing system (Step S4). Additionally, if the testing system is not used for the first time, setting (Step S501) and saving (S502) the testing parameters can be omitted, and the workpieces can be tested in accordance with testing parameters saved in the parameter module 24 at last time.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A testing system for testing flatness of a surface of a workpiece, comprising:
a testing apparatus including a testing box and a measuring apparatus; the testing box including a plurality of holders, the holders defining a datum plane; the measuring apparatus comprising a plurality of movable testing poles extending out of the testing box and a plurality of gauges configured for measuring distance of the testing poles retracting into the testing box, ends of the testing poles away from the testing box being located at the datum plane and configured for supporting the surface of the workpiece thereon to allow the gauges measuring retracting distance of the testing poles under the pressure of the workpiece, the retracting distance of the testing poles being equal to distances between testing points on the surface of the workpieces and the datum plane; and a processor being connected to the testing apparatus for receiving and processing testing data which are converted from the retracting distance of the testing poles measured by the gauges.

2. The testing system as claimed in claim 1, wherein the testing box includes a top board, wherein the holders are mounted on the top board, and top ends of the holders define the datum plane.

3. The testing system as claimed in claim 2, wherein the gauges are micrometers mounted in the testing box, each testing pole extending from a corresponding one of the micrometers through the top hoard and being moveable in a direction perpendicular to the datum plane.

4. The testing system as claimed in claim 3, wherein the testing apparatus includes an interface; the micrometers are connected to the processor via the interface.

5. The testing system as claimed in claim 3, wherein the testing apparatus includes a controlling apparatus configured for adjusting positions of the testing poles to cause the ends of the testing poles away from the testing box being located at the datum plane before the workpiece is placed on the testing poles.

6. The testing system as claimed in claim 1, wherein the processor includes a display module, the display module is used to display relational data and test results.

7. A testing method for testing flatness of a surface of a workpiece via a testing system which comprises a testing box, a measuring apparatus. a plurality of holders extending out of the testing box, a checking block defining a checking plane and a processor, distal ends of the holders at outside of the testing box defining a datum plane, the measuring apparatus comprising a plurality of movable testing poles, ends of the testing poles being located at the datum plane, the method comprising steps of:

initializing the testing system to place the checking block on the holders with the Checking plane contacting with the distal ends of the holder and adjust the testing poles to cause the end of each testing pole to contact with the checking plane:

setting testing parameters in the processor;

placing the workpiece on the testing poles to cause the ends of the testing poles respectively to contact with testing points on the surface of the workpiece so that some of the testing poles corresponding to the testing points which locate under the datum plane partly retract to the testing box under the pressure of the workpiece;

recording the retracting distances of the testing poles and converting the retracting distances into testing data;

outputting the testing data to the processor; and the processor generating test results via comparing the testing data with the testing parameters.

8. The testing method as claimed in claim 7, wherein the testing system further comprises buttons mounted at an exterior surface of the testing box, a controlling apparatus which comprises a driving apparatus mounted in the testing box configured for driving the testing poles to move relative to the testing box, and a controller configured for controlling the driving apparatus to drive movement of the testing poles via pressing the buttons in the Initializing step.

9. The testing method as claimed in claim 7, wherein each of the testing poles extends from a micrometer that is mounted in the testing box.

10. A testing method for testing flatness and parallelism of a workpiece, comprising the steps of:

providing a testing system which comprises a plurality of holders defining a datum plane, a checking block defining a checking plane and a plurality of movable testing poles corresponding to a plurality of testing points on a surface of the workpiece;

initializing the testing system to make the checking plane coincide with the datum plane, and cause the end of each testing pole to be in contact with the checking plane;

setting testing parameters of the workpiece;

removing the checking black and placing the workpiece on the holders to cause the ends of the testing poles to be in contact with the testing points;

measuring and recording the displacement of each testing pole as testing data; and generating test results via comparing the testing data with the testing parameters.

11. The method as claimed in claim 10, further comprising a step of recording relational data of initializing after the step of initializing the testing system.

12. The method as claimed in claim 10, wherein the step of initializing the testing system comprises the substeps:

placing the checking block on the holders; and adjusting the testing poles to cause the end of each testing pole to be as close to the checking plane as possible.

13. The method as claimed in claim 10, wherein the step of initializing the testing system comprises the substeps:

placing the checking block on the holders; and pressing the testing poles with the checking plane of the checking block so that the testing poles partly retract under the pressure.

* * * * *